US008712739B2

(12) United States Patent
Jiang et al.

(10) Patent No.: US 8,712,739 B2
(45) Date of Patent: Apr. 29, 2014

(54) SYSTEM AND METHOD FOR HYBRID RISK MODELING OF TURBOMACHINERY

(75) Inventors: Xiaomo Jiang, Atlanta, GA (US); Christopher John Farral, Greenville, SC (US); Tong Zou, Greenville, SC (US)

(73) Assignee: General Electric Company, Schenectady, NY (US)

( * ) Notice: Subject to any disclaimer, the term of this patent is extended or adjusted under 35 U.S.C. 154(b) by 346 days.

(21) Appl. No.: 12/950,891

(22) Filed: Nov. 19, 2010

(65) Prior Publication Data

US 2012/0130688 A1 May 24, 2012

(51) Int. Cl.
*G06F 7/60* (2006.01)
*G06F 17/10* (2006.01)
*G06G 7/48* (2006.01)

(52) U.S. Cl.
USPC ..................... 703/2

(58) Field of Classification Search
None
See application file for complete search history.

(56) References Cited

U.S. PATENT DOCUMENTS

| | | | | |
|---|---|---|---|---|
| 6,343,251 | B1 | 1/2002 | Herron et al. | |
| 6,438,484 | B1 | 8/2002 | Andrew et al. | |
| 6,532,433 | B2 | 3/2003 | Bharadwaj et al. | |
| 6,786,635 | B2 | 9/2004 | Choi | |
| 6,799,154 | B1 | 9/2004 | Aragones et al. | |
| 6,832,205 | B1 | 12/2004 | Aragones et al. | |
| 6,922,657 | B2 | 7/2005 | Asatsu et al. | |
| 7,020,595 | B1 | 3/2006 | Adibhatla et al. | |
| 7,065,471 | B2 | 6/2006 | Gotch et al. | |
| 7,107,491 | B2 | 9/2006 | Graichen et al. | |
| 7,162,373 | B1 | 1/2007 | Kadioglu et al. | |
| 7,243,042 | B2 | 7/2007 | Plotts et al. | |
| 7,328,128 | B2 | 2/2008 | Bonanni et al. | |
| 7,509,235 | B2 | 3/2009 | Bonissone et al. | |
| 7,536,364 | B2 | 5/2009 | Subbu et al. | |
| 7,548,830 | B2 | 6/2009 | Goebel et al. | |
| 7,580,802 | B2 | 8/2009 | Moen | |
| 7,769,507 | B2 | 8/2010 | Volponi et al. | |
| 2001/0032109 | A1* | 10/2001 | Gonyea et al. | 705/8 |
| 2006/0116847 | A1* | 6/2006 | Plotts et al. | 702/136 |
| 2008/0140360 | A1 | 6/2008 | Goebel et al. | |
| 2009/0055130 | A1 | 2/2009 | Pandey et al. | |
| 2011/0106680 | A1* | 5/2011 | Vittal et al. | 705/35 |
| 2012/0290104 | A1* | 11/2012 | Holt et al. | 700/29 |
| 2013/0054213 | A1* | 2/2013 | Rohm et al. | 703/7 |

FOREIGN PATENT DOCUMENTS

WO 2008135789 11/2008

OTHER PUBLICATIONS

Zhao, "An Integrated Framework for Gas Turbine Based Power Plant Operational Modeling and Optimization", Georgia Institute of Technology, 2005, 356 pages.*
AWARE, "Are you AWARE of your piping condition?", 2007, 10 pages.*

* cited by examiner

*Primary Examiner* — David Silver
(74) *Attorney, Agent, or Firm* — Fletcher Yoder, P.C.

(57) ABSTRACT

Systems and methods are disclosed herein for enhancing turbomachine operations. Such systems and methods include a hybrid risk model. The hybrid risk model includes a physics-based sub model and a statistical sub model. The physics-based sub model is configured to model physical components of a turbomachine. The statistical sub model is configured to model historical information of the turbomachine. The hybrid risk model is configured to calculate a turbomachine parameter.

19 Claims, 7 Drawing Sheets

SYSTEM AND METHOD FOR HYBRID RISK MODELING OF TURBOMACHINERY

BACKGROUND OF THE INVENTION

The subject matter disclosed herein relates to systems and methods relating to risk modeling.

A variety of systems, such as turbine systems, may include a complex mechanical interrelationship between different components and subcomponents. For example, a turbine may include one or more rotor stages (e.g., wheels and blades) capable of an axial rotation. The blades or buckets of each stage are capable of converting a fluid flow into a mechanical movement. The buckets are attached to the rotor wheel via a variety of fasteners, such as a lockwire tab. Unfortunately, the fasteners may exhibit wear (e.g., stress cracks) and require repair or replacement. Likewise, other components of the turbine systems may exhibit wear and require repair or replacement. Currently, manual inspection and testing procedures are used to determine if a component is due for repair or replacement. Such inspection and testing requires the shutdown of the turbine system, which is typically time consuming and expensive.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system for analyzing turbomachinery includes a hybrid risk model. The hybrid risk model includes a physics-based sub model and a statistical sub model. The physics-based sub model is configured to model physical components of a turbomachine. The statistical sub model is configured to model historical information of the turbomachine. The hybrid risk model can calculate a turbomachine parameter.

In a second embodiment, non-transient machine readable computer media includes a hybrid risk model. The hybrid risk model includes a physics-based sub model and a statistical sub model. The physics-based sub model is configured to model physical components of a turbine system. The statistical sub model is configured to model historical turbine system information. The hybrid risk model can calculate a turbine system parameter.

In a third embodiment, a method of creating a hybrid risk model includes analyzing physical components of a turbomachine to obtain a physics-based analysis. The method also includes analyzing statistical information of the turbomachine to obtain a statistical analysis. Additionally, the method includes integrating the physics-based analysis and the statistical analysis. A hybrid risk model is derived based on the integration of the physics-based analysis and the statistical analysis. The hybrid risk model is configured to calculate a turbomachine parameter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
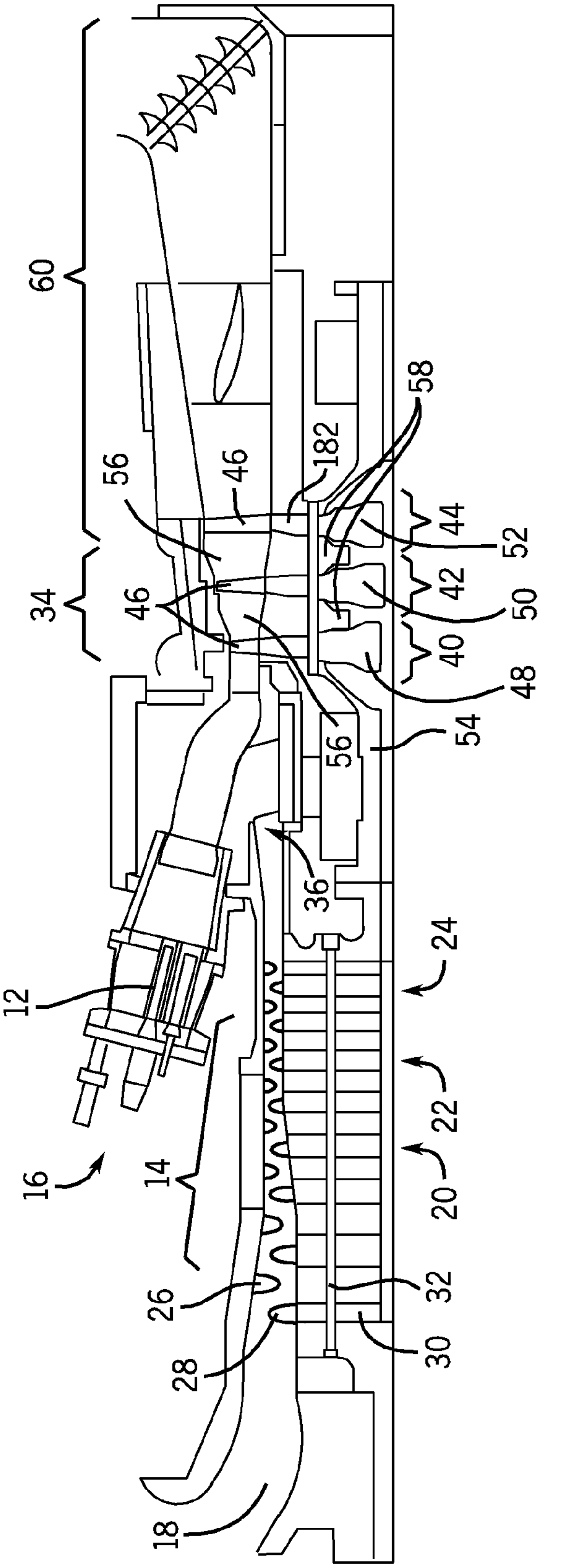
FIG. 1 PRIOR ART
FIG. 1 depicts a cross-sectional view of an embodiment of a turbine system, illustrating exemplary components.

The disclosed embodiments include systems and methods for predicting equipment outages, optimizing operational lifecycles, and/or improving maintenance processes of mechanical systems. More specifically, the disclosed embodiments include the creation of hybrid risk models that enable the integration of a physics-based analysis or models with a statistical analysis or models of empirical data observed during the real world usage of mechanical machinery, such as the turbine system described in more detail with respect to FIG. 1 below. The hybrid risk models also enable the unit level prediction of outages, lifecycle optimization, and/or improved management of individual units, such as individual turbine systems. That is, a fleet of turbine systems, such as a fleet of MS-7000F turbine systems, a fleet of MS-7000FA turbine system, and/or a fleet of MS-9000F turbine systems, available from General Electric Co. of Schenectady, N.Y., may be operationally managed at the individual turbine level, thus allowing for the individual management of substantially all of the turbine installations in the fleet. Additionally, the embodiments described herein, allow for the sharing of data, models, calculations, and/or processes across the turbine fleet, thus enabling a multi-level operational management (e.g., unit level and fleet level) of the turbine fleet.

Statistical analysis may be used, for example, to attempt to predict the outage risk of a turbine component based on historical data. However, such statistical analysis may not be as accurate, especially when applied to predictions for a specific unit. Physics-based analysis of components may also be used in an attempt to predict equipment outages. Such physics-based analysis may create models that include virtual representations of the components. The virtual representations may then be used, for example, to simulate "wear and tear" of the components. However, such physics-based analysis alone may also not realize a desired level of predictive accuracy. The disclosed embodiments allow for the derivation of hybrid risk models that integrate certain statistical analysis with physics-based analysis. The hybrid risk models may result in an improved predictive accuracy. Indeed, the disclosed embodiments allow for a much improved level of predictive accuracy over the entire lifespan of individual turbine installations or other turbomachinery.

In certain embodiments, the behavior of a specific turbine system may be observed during the operational life of the system, and such observations may be used to predict unwanted maintenance events, such as the occurrence of a crack in a lockwire tab, that may require unplanned maintenance and/or incur additional costs. Indeed, the disclosed embodiments improve the operational life of mechanical systems by analyzing data from such systems, determining the likelihood of unplanned maintenance events, and recommending the replacement of certain parts so as to minimize or substantially eliminate unplanned disruptions of system operations. Accordingly, a much improved maintenance schedule and asset management of systems in a turbine fleet, may be realized. Indeed, the operational life of the analyzed turbo machinery may be improved while reducing or substantially eliminating the occurrence of unplanned maintenance events.

It may be beneficial to first discuss embodiments of certain mechanical systems that may be used with the disclosed embodiments. With the foregoing in mind and turning now to FIG. 1, the figure illustrates a cross-sectional side-view of an embodiment of a turbine system or gas turbine engine 10. Mechanical systems, such as the turbine system 10, experience mechanical and thermal stresses during operating conditions, which may require periodic maintenance or replacement. During operations of the turbine system 10, a fuel such as natural gas or syngas, may be routed to the turbine system 10 through one or more fuel nozzles 12 into a combustor 16. Air may enter the turbine system 10 through an air intake section 18 and may be compressed by a compressor 14. The compressor 14 may include a series of stages 20, 22, and 24 that compress the air. Each stage may include one or more sets of stationary vanes 26 and blades 28 that rotate to progressively increase the pressure to provide compressed air. The blades 28 may be attached to rotating wheels 30 connected to a shaft 32. The compressed discharge air from the compressor 14 may exit the compressor 14 through a diffuser section 36 and may be directed into the combustor 16 to mix with the fuel. For example, the fuel nozzles 12 may inject a fuel-air mixture into the combustor 16 in a suitable ratio for optimal combustion, emissions, fuel consumption, and power output. In certain embodiments, the turbine system 10 may include multiple combustors 16 disposed in an annular arrangement. Each combustor 16 may direct hot combustion gases into a turbine 34.

As depicted, the turbine 34 includes three separate stages 40, 42, and 44. Each stage 40, 42, and 44 includes a set of blades or buckets 46 coupled to a respective rotor wheel 48, 50, and 52, which are attached to a shaft 54. As the hot combustion gases cause rotation of turbine blades 46, the shaft 54 rotates to drive the compressor 14 and any other suitable load, such as an electrical generator. Eventually, the turbine system 10 diffuses and exhausts the combustion gases through an exhaust section 60.

Figure 2:
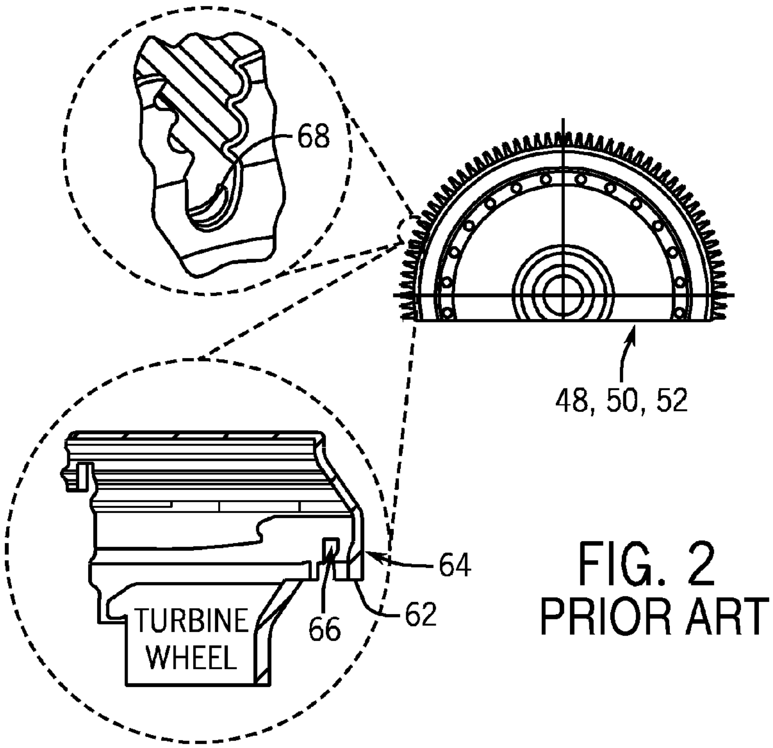
FIG. 2 PRIOR ART
FIG. 2 depicts a detail view of an embodiment of components of the turbine system illustrated in FIG. 1.

Turbine components, such as the blades or buckets 46 may be attached to the rotor wheels 48, 50, and 52 through fasteners, such as a lockwire tab as illustrated in FIG. 2. The blades 46 and lockwire tab are subjected to high temperatures and stresses during engine operation. Periodic inspections may be performed to test and verify that the lockwire tab and blades 46 are within specified operating parameters. For example, eddy current tests may be used to analyze the lockwire tab, air cooled slots, outer tang fillets, and inner tang fillets for each blade 46. However, the turbine system 10 is generally taken offline to perform these tests, which may be very expensive and inefficient.

FIG. 2 illustrates a detail view of an embodiment of a rotor wheel (e.g., rotor wheel 48, 50, or 52), Each rotor wheel 48, 50, or 52 includes a fastening device, such as a lockwire tab 62, suitable for coupling the blades 46 to the respective rotor wheel 48, 50, or 52. The lockwire tab 62 includes an outboard side 64 generally facing outwardly from a center of the rotor wheel 48, 50, or 52, and an inboard side 66 generally facing inwardly towards the center of the rotor wheel 48, 50, or 52. The rotor wheel 48, 50, or 52 also include an air cooling slot 68 useful for reducing the temperature of the wheel 48, 50, or 52 during wheel rotation. The lockwire tab 62 and the air cooling slot 68 may experience unplanned maintenance events. For example, crack formation may occur at the outboard or inboard sides 64, 66 of the lockwire tab 62. Likewise, the air cooling slot 68 may experience crack formation around its circumference.

As discussed in further detail below, the disclosed embodiments include the creation of a models, such as hybrid risk models, capable of capturing the physics of the component being analyzed (e.g., wheels 48, 50, 52) and integrating the physics-based models with statistical analysis. Such a unit-level hybrid risk model may be used, for example, to predict the risk of an unplanned event for a specific turbine system 10 in the fleet. Part-level hybrid risk models may also be used to predict the risk of unplanned events in the fleet related to a part and part location, such as the lockwire tab 62 outboard side 64, lockwire tab 62 inboard side 66, and the air cooling slot 68. Accordingly, the probability of an unplanned maintenance event for an individual turbine system or unit 10 based on the number of actual fired hours may be calculated. Further, the hybrid risk models may be used to optimize operations for each or for all turbine units 10 in the fleet. For example, a more efficient maintenance and downtime schedule may be arrived at by using the predictive embodiments described herein. It is to be understood that the techniques described herein may be used in almost any mechanical system that experiences "wear and tear." Indeed, an asset management logic suitable for managing a variety of mechanical assets, such as the asset management logic of FIG. 3 below, may be used in a number of mechanical systems, including the turbine system 10.

Figure 3:
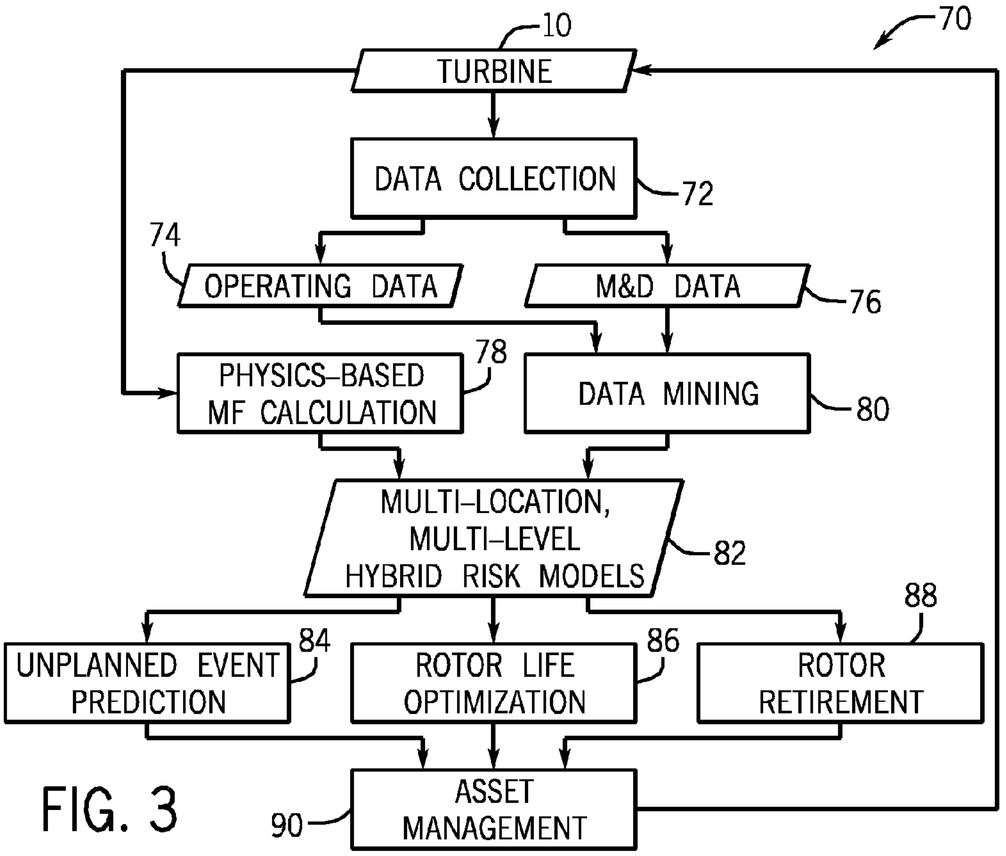
FIG. 3 depicts a flow chart of an embodiment of a modeling and asset management logic.

FIG. 3 is a flow chart of an embodiment of a logic 70 that may be used to model and manage assets of a turbomachine, such as the turbine system 10. It is to be understood, that the logic 70 and the disclosed embodiments may be used with any turbomachinery, such as turbines, compressors, and pumps. Turbines may include gas turbines, steam turbines, wind turbines, hydro turbines, and so forth. Further, the logic 70 may include non-transitory machine readable code or computer instructions that may be used by a computing device to transform data, such as sensor data, into hybrid risk models and asset management processes. Additionally, the logic 70 as well as any of the models and sub models described herein may be stored in a controller and used to control, for example, logistic and maintenance activities related to the turbomachine and turbomachine's assets. Accordingly, a variety of data from each individual turbine system 10 may be collected (block 72). Data may include operating data 74 and monitoring and diagnosis (M&D) data 76. Operating data 74 may include a maintenance history for each unit 10 in the fleet, including maintenance log data such as hardware configuration history, and date and type of repairs. The operational data 74 may also include the dates and types of turbine starts (e.g., hot start, medium start, cold start) and any unplanned maintenance events (e.g., lockwire cracks, air cooling slot cracks). The M&D data 76 may include data transmitted, for example, by sensors at a number of locations and systems on the turbine 10, such as on fuel nozzles 12, compressor 14, combustor 16, turbine 34, and/or exhaust section 60. Additionally, the sensed data may include temperature, pressure, flow rate, rotation speed, vibration, and/or power generation (e.g., watts, amperage, volts).

A physics-based maintenance factor (MF) calculation (block 78) may be derived for each unit 10 in the fleet. In one embodiment, the MF calculation is based on a life parameter (LP) function or curve. The LP function is used to define the operational lifetime at certain temperatures for a certain part and/or location in a part, such as the lockwire tab 62 and/or air cooling slot 68. The LP function may be derived by modeling a mechanical component (e.g., blade, lockwire tab, air cooling slot) through physics-based modeling techniques, such as low cycle fatigue (LCF) life prediction modeling, computational fluid dynamics (CFD), finite element analysis (FEA), solid modeling (e.g., parametric and non-parametric modeling), and/or 3-dimension to 2-dimension FEA mapping. Indeed, a variety of modeling techniques may be used, including thermal fluid dynamics techniques, which may result in numerical and physical modeling of the turbine system 10 and turbine components. In one embodiment, the LP function may be derived at various metal temperatures as a transfer function based on the temperature of a metal, a stress, and fired hours per start (i.e., $N_{ratio}$), as described in more detail below. The LP function may then be normalized, resulting in a normalized life parameter (NLP) function or curve. The MF can then be obtained generally as the inverse of the NLP, that is, MF=SSF*1/NLP, where SSF is a stress scaling factor for different component configurations (e.g., curved slots versus square slots) as described in more detail below.

Data mining activities (block 80) may be used that may use the operating data 74 and M&D data 76 as inputs. The data mining inputs may be pre-processed, and then analyzed to extract patterns from the data. Data mining techniques may include clustering techniques, classification techniques, regression modeling techniques, rule learning (e.g., association) techniques, and/or statistical techniques suitable for identifying patterns or relationships amongst the input data. For example, clustering techniques may discover groups or structures in the data that are in some way "similar." Classification techniques may classify data points as members of certain groups, for example, turbines 10 having a higher probability of encountering an unplanned maintenance event. Regression techniques may be used to find functions capable of modeling the data within a certain error range. Rule learning techniques may be used to find relationship between variables. For example, using rule learning may lead to associating certain cold start procedures with increased blade wear. The physics-based MF calculation (block 78) and data mining (block 80) may enable the creation of multi-location, multi-level hybrid risk models 82.

The multi-location, multi-level hybrid risk models 82 can operate at different levels of the turbine system 10, for example, the models may enable predictive abilities for the turbine system 10 as a whole, for a turbine system component such as a rotor or a compressor, for individual rotor components such as a rotor blade, and for individual sections of the rotor wheel such as lockwire tabs 62 and air cooling slots 68. The hybrid risk models can also operate across locations of a system such as the turbine system 10. Example locations used for predictive results may include the air intake section, the compressor section, the rotor section, and the exhaust section. Indeed, any location or section of the turbine system 10 may be used. Additionally, the multi-location, multi-level hybrid risk models 82 enable an unplanned event prediction (block 84), rotor life optimization (block 86) and/or rotor retirement (block 88).

Unplanned event prediction (block 84) may be used to predict unplanned events such as lockwire tab events, air cooling slot events, metal stress related events, temperature stress related events, and/or operational use related events. That is, the probability of the occurrence of unplanned maintenance events, such as a lockwire tab crack, may be predicted for an individual unit 10, and corrective action may be taken before the actual occurrence of the event. For example, fired hours may be used to predict a high likelihood of an unplanned maintenance event relating to a specific rotor wheel. The turbine system 10 may then undergo preventative maintenance to inspect and/or replace the rotor wheel. Indeed, such predictive abilities enable a more optimal lifetime and improved performance for turbomachinery, such as the turbine system 10. Accordingly, the predictive capabilities of the techniques disclosed herein allow for rotor life optimization (block 86).

Rotor life may be optimized (block 86), for example, by creating and following a maintenance program based on the actual usage and life history of a specific turbine system 10, and one or more hybrid risk models 82. The maintenance program may take into account the previous maintenance history for the turbine system 10, the component installation history (e.g., types of components installed), the operational hours (including hot, warm and cold starts hours), the type of fuel burned (e.g., liquid fuel, syngas), the loads produced, operating data 74 and/or M&D data 76. A procedure for predicting rotor retirement (block 88) may also be used, as described in more detail below, to maximize the utilization (e.g., hours used) of the rotor before retiring and replacing the rotor.

Asset management (block 90) for the turbine system 10 may thus include unplanned event prediction (block 84), rotor life optimization (block 86), and rotor retirement procedures (block 88). The turbine system 10 may be further managed by creating, for example, a computerized system suitable for tracking turbine components and related assets, including the occurrence of planned and unplanned maintenance events, component installation history, operational hours, loads, and other operating data 74 and M&D data 76. Such a computerized system may also include non-transitory computer media storing the hybrid risk models 82 and instructions to update the hybrid risk models 82 with new data 74 and 76. Accordingly, the computerized system may be used at a customer site to manage the individual turbine systems 10 or a fleet of turbine systems 10. Indeed, such a computerized asset management system may increase the operational life of a fleet of turbine systems 10 by continuously monitoring the systems 10, updating the hybrid risk models 82, and enabling the better utilization of the managed assets.

Figure 4:
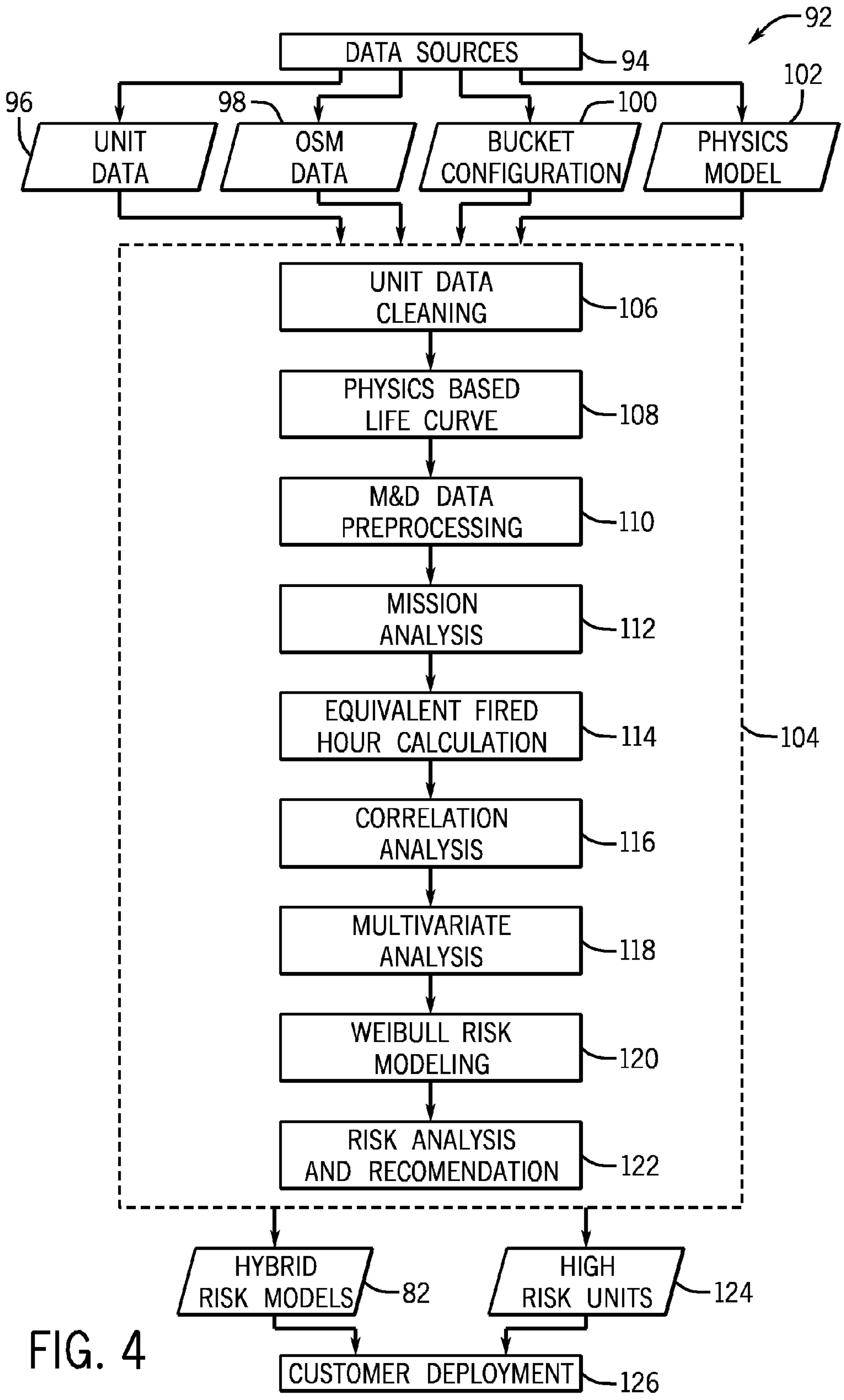
FIG. 4 depicts a flow chart of an embodiment of a hybrid risk modeling logic.

FIG. 4 is a flow chart of an embodiment of a logic 92 suitable for deriving the hybrid risk models 82. In the illustrated example, one or more data sources 94 are used to provide data inputs such as unit 10 data 96, OSM (On Site Monitoring) data 98, bucket or blade configuration data 100, and physics model data 102. The data sources 94 may include sensors disposed on the turbine systems 10, maintenance logs (e.g., unplanned events, planned events), engineering drawings (e.g., CAD drawings), engineering models (e.g., CFD models, FEA models, solid models, thermal models), and the current turbine system configuration. The data 96, 98, 100, and 102 may then be used in a physics and statistics analysis logic 104. The logic 104 may first perform a unit data cleaning (block 106). The unit data cleaning (block 106) may pre-process data records, for example, by removing incorrect records and/or duplicate records. The unit data cleaning (block 106) may also convert certain records to include the same units (e.g., metric units, imperial units), normalize time scales (e.g., convert from seconds to minutes), and more generally, prepare the data for further processing. "Clean" data may then be used to derive a physics-based life curve (block 108), or LP, as described in more detail below with respect to FIGS. 4-6. After the derivation of the physics-based life curve, a M&D data pre-processing (block 110) may take place suitable for filtering and cleaning the M&D data. The pre-processing of the M&D data is very similar to the unit data cleaning (block 106). That is, the M&D data pre-processing (block 110) may include the removal of invalid records, normalize data, and prepare the data for further processing.

The M&D data pre-processing (block 110) may then be followed by a mission analysis (block 112). The mission analysis (block 112) may include mathematical and/or statistical analysis of the M&D data 76 and may integrate the MF equation described above with respect to FIG. 3. The mission analysis (block 112) may be used to calculate a set of values for each individual unit 10 in the fleet, such as the median, mean, average, percentiles, cumulative distribution functions, and/or probability density functions, for a plurality of M&D variables. A non-exhaustive list of M&D variables may include generator watts (DWATT), turbine horsepower (TNH), fuel reference (FSR), position of the compressor inlet guide vane (CSGV), ambient inlet temperature (TAMB), compressor inlet temperature (CTIM), compressor discharge temperature (CTD), compressor discharge pressure (CPD), compressor pressure ratio (CPR), fuel stroke reference position (FSR), high pressure turbine shaft speed in % (TNH), exhaust temperature (TTXM), combustion reference temperature (TTRF1), turbine wheel space temperature $1^{st}$ stage forward inner (TTWS1F1), and/or turbine wheel space temperature $1^{st}$ stage after outer (TTWS1AO), number of cold starts, number of hot starts, and number of warm starts. Indeed, a variety of turbine system 10 values and performance parameters may be used.

The amount of M&D data may be quite large, in some cases, the data is collected at approximately five minute intervals over the course of two or more years. The mission analysis (block 112) aids in identifying variables of particular suitability for use in the analysis process. Such variables are deemed "vital X" variables and an identification logic for such variables is described in more detail with respect to FIG. 5 below. The mission analysis (block 112) also distills or reduces the large M&D data set into selected statistical and mathematical values (e.g., median, mean, average, percentiles, cumulative distribution functions, and/or probability density functions) suitable for use as inputs into other analytic logic, such as the logic used to calculate an equivalent fired hour (block 114). For example, the mission analysis (block 112) may calculate an approximately three-year, two-year, one-year, six-month, three-month mean, median, and/or average for each of the M&D variables described above (e.g., DWATT, TNH, FSR, CSGV, TAMB, and so forth), which may be used to calculate an equivalent fired hour (block 114).

The equivalent fired hour (Equivalent_FH) derivation (block 114) integrates physics-based model analysis with statistical analysis through the equation Equivalent_FH=MF*FH, where FH corresponds to the actual fired hours for a given turbine system or unit 10. Indeed, the equivalent fired hour enables the individual units 10 to be tracked and managed, and incorporates the physics-based and statistical MF analysis with the empirical fired hours of each individual unit 10 in the turbine fleet. Further statistical techniques, such as correlation analysis (block 116), may be utilized as described in more detail below to process the data.

Correlation analysis (block 116) may be used, for example, to find relationships between variables suitable for predictive use. In certain examples, Pearson correlation analysis may be used to describe the relationships between all of the M&D factors or variables, and a Pearson coefficient indicative of a dependence between two variables may be derived and used. Additionally, the equivalent fired hour may be correlated with all of the M&D factors. Further, physics-based correlation may be used where the variables are correlated to each other based on their corresponding measurement location and physical characteristics (e.g., component geometry, metal type). Other statistical correlation techniques such as t-statistics, interclass correlation, and/or intraclass correlation, may be used. The correlation analysis (block 116) and a multivariate analysis (block 118) aid in identifying variables of particular suitability for use in the predictive process. Such variables are deemed "vital X" variables and an identification logic for such variables is described in more detail with respect to FIG. 5 below.

The multivariate analysis (block 118) may include analysis of variance techniques (ANOVA) and/or logistic analysis. ANOVA can be used, for example, to analyze a variance in a particular variable (e.g., M&D data), and to partition the variance into variance components based on possible sources of the variation. For example, warm starts may cause a larger portion of the variation in the equivalent fired hours. Logistic analysis (i.e., logit modeling) enables the derivation of the probability of occurrence of an event by fitting the data to a logistic curve (e.g., sigmoid curve). Other multivariate analysis techniques may be used, such as MANOVA and multiple discriminant analysis, as described below. Suitable variables found through the "vital X" analysis may then be used in a risk modeling analysis, such as a Weibull risk modeling (block 120). In certain embodiments, the Weibull risk modeling (block 120) may be used to derive a set of proportional hazard models. The proportional hazard models may relate the time that passes before the occurrence of an unplanned maintenance event (e.g., air cooling slot cracking, lockwire tab cracking, wheel replacement, blade cracking) to one or more co-variates (e.g., M&D factors, equivalent fired hours). For example, increasing a certain percentage of warm starts may increase the probability of the occurrence of an inboard first stage unplanned event. The Weibull risk modeling (block 120) may also incorporate an interval censoring approach suitable for analyzing event occurrences between observations, such as between turbine inspections. The interval censoring approach thus enables the derivation of a survival function between two inspection events that may be used to predict the likelihood of unplanned event occurrences.

Accordingly, a risk analysis and recommendation (block 122) may use the Weibull risk modeling (block 120) and aforementioned statistical techniques (e.g., equivalent fired hour calculations 114, correlation analysis 116, multivariate analysis 118) to derive the set of hybrid risk models 82 and to determine any high risk units 124 that may be operational in the fleet. Indeed, the hybrid risk models 82 and the list of high risk units 124 may be deployed to a customer (block 126) for use in managing turbine operations and assets. Customers may then use the hybrid risk model 82 to improve usage of the turbine system 10 by enabling a more efficient and targeted maintenance plan for individual units 10 in the fleet. Such abilities may result in an increased life and reduced maintenance cost for units 10 in the fleet.

Figure 5:
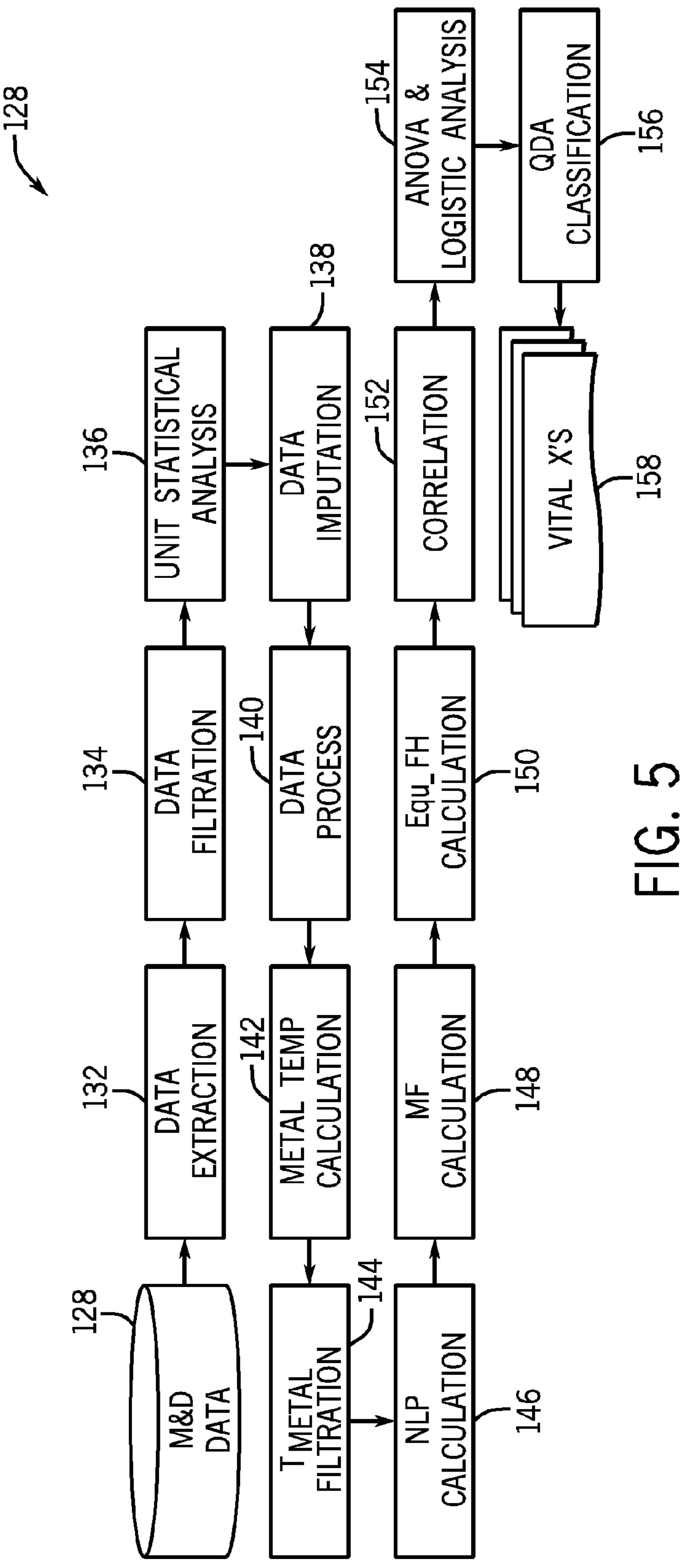
FIG. 5 depicts a flow chart of an embodiment of an identification logic.

FIG. 5 illustrates an embodiment of a "vital X" identification logic 128 that enables the classification of a plurality of variables, such as M&D variables, as variables with a particular suitability for use in the predictive process. As mentioned above, the number of M&D variables may be quite large, and the amount of data collected for each M&D variable may be collected at intervals (e.g., approximately five minutes) over a span of several years. Accordingly, the "vital X" identification logic 128 enables a reduction in the amount of variables used in the predictive process. The logic 128 may first use an M&D database 130 with a data extraction (block 132) to extract data corresponding to the M&D variables including, for example, DWATT, TNH, FSR, CSGV, TAMB, TIM, CTD, CPR, TNH, TTXM, TTRF1, TTWS1F1, and TTWS1AO. The logic 128 may then use the extracted data with a data filtration (block 134) to validate the data and to filter the data. Data validation may include removing incorrect data, such as data having negative values when all values should be positive (e.g. time values). Similarly, data filtration may remove or filter certain data that may not be useful, for example data points where TNH<95 and DWATT<15. The logic 128 may then use the filtrated data with a unit statistical analysis (block 136) to derive a set of statistical values for each unit 10 in the fleet. Such values may include maximum, minimum, mean, median, cumulative distribution functions, and/or probability density functions. In certain embodiments, the unit statistical analysis 136 may derive statistical values based on data collected every 30 secs., 1 min., 5 min., 10 min., or 30 min. A data imputation (block 138) may then impute or assign any missing values, for example, by using the mean values found in the unit statistical analysis (block 136). For example, any missing CTD, TTWS1F1, or TTWS1A0 values may be assigned (block 138) the mean values for each respective variable found during the unit statistical analysis (136).

A data process (block 140) may then process and derive related values based on the M&D database 130. For example, a TTWS1_temp may be derived based on a maximum temperature comparison between two TTWS1 values, such as the two most recent values (i.e., values found at time n and time n+1). A metal temperature calculation (block 142) may then use a physics-based function to calculate the temperature of a metal at different locations in the turbine system 10. For example, the temperature of a metal such as inconel (e.g., inconel IN706) may be found for the air slot located in a turbine rotor, first stage, or for the lockwire tab located in the same turbine rotor, second stage. Indeed, the metal temperature calculation (block 142) may be used to calculate metal temperatures at a multitude of locations in the turbine system 10. A delta temperature ΔT may be found based on the equation $\Delta T = T_{ACT} - T_{ISO}$, where $T_{ACT}$ is actual temperature at a turbine location (e.g., air cooling slot, lockwire tab) and $T_{ISO}$ is an ISO-day temperature. More specifically, the ISO-day temperature corresponds to an International Standards Organization (ISO) reference temperature typically used for comparative purposes. Such reference temperature may be found in ISO documents such as ISO document 2314 "Gas Turbine-Acceptance Test".

The delta temperature ΔT may then be processed by a metal temperature filtration process (block 144) so as to filter temperatures ranges at different locations. That is, certain temperature measurement outside of a given range may not be used, thus resulting in a range of temperatures that are useful in deriving other calculations. For example, ΔT may be set to −91° F. for values less than −91° F., and ΔT may be set to 209° F. for values greater than 209° F. Accordingly, the metal temperature filtration process (block 144) may aid in reducing outliers values.

A normalized life parameter (NLP) calculation (block 146) may then be used to derive a normalized life parameter (LP). As mentioned above, the LP is calculated at different metal temperatures for a given material and location. More specifically, the LP calculation or risk based on time left before unplanned event occurrence (e.g., air cooling slot cracking, lockwire tab cracking, wheel replacement, blade cracking) may be calculated as a function of the metal temperature $T_{metal}$, stress σ at the location of interest, and fired hours per start (i.e., $N_{ratio}$). The LP may be derived for different locations (e.g., air cooling slot, lockwire tab) and configurations for actual temperatures, ISO-day temperatures, and modeled (e.g., "virtual" temperatures). The configurations may include the turbine frame type (e.g., 7F, 7FA, 7FA+, 7FA+e), the bucket or blade type (e.g., stage 1B, stage 2B), the bucket design being used (original design, new design), and/or the whether the bucket is a backcut bucket. By using a set of physics-based modeling techniques, such as low cycle fatigue (LCF) life prediction modeling, computational fluid dynamics (CFD), finite element analysis (FEA), solid modeling (e.g., parametric and non-parametric modeling), and/or 3-dimension to 2-dimension FEA mapping, a suitable function LP=function ($T_{metal}$, σ, $Nr_{atio}$) may be derived. The resulting LP parameter at various temperatures may then be normalized (i.e., converted to NLP), by using, for example, the equation $NLP = LP/LP_{ISO}$.

A NLP curve may be plotted by placing the NLP parameters in the y-axis of the NLP curve and the ΔT values in the x-axis. In one embodiment, the NLP curve may be derived by fitting a scatter plot using a non-linear fit or function for the negative ΔT values, and an exponential fit or function for the positive ΔT values. The resulting NLP curve maps an NLP parameter for any given ΔT. A MF calculation (block 148) may then convert the NLP parameter to an MF value through the use of the equation MF=SSF*1/NLP, where SSF is a stress scaling factor σ. The stress scaling factor σ may vary based on the configuration in use (e.g., turbine frame, bucket type, bucket design, and bucket cut). More details on the MF calculation, including a variation on the MF calculation for units 10 that have a mixed hardware configuration, are described with respect to FIG. 6 below.

The equivalent fired hour calculation (block 150) may then calculate the equivalent fired hour (Equivalent_FH) based on the equation Equivalent_FH=MF*FH, where FH corresponds to the actual fired hours for a given unit 10. A correlation analysis (block 152) may then be performed, as described above with respect to FIG. 4, including the use of ANOVA techniques and/or logistic analysis (block 154). The correlation analysis 152 may use statistical and/or physics-based correlation to map the relationships between the different variables in the M&D data 76. In one example, the logic 128 may use data mining classification techniques, such as quadratic discriminant analysis (QDA) classification (block 156), to classify the data. For example, the QDA classification (block 156) may classify the data based on a correct failure prediction, an incorrect failure prediction, a correct failure suspension (e.g., system stoppage), and an incorrect failure suspension. The QDA classification (block 156) is thus useful for a comparison approach to the multivariate risk modeling (e.g., ANOVA). The result of the use of the aforementioned techniques is the identification of one or more "vital X" variables suitable for use in predicting unplanned events. For example, inboard lockwire tab cracking at stage 1W may be better predicted using Equivalent_FH, Starts, and percentage warm starts, as the "vital X" variables 158. Likewise, inboard lockwire tab cracking at state 2W may be better predicted using Equivalent_FH and the $N_{ratio}$ as the "vital X" variables 158. It is to be understood that other statistical techniques may be used to arrive at the "vital X" variables 158, for example, using any suitable correlation analysis, including other forms of multivariate analysis (e.g., MANOVA), and/or suitable discriminant analysis techniques (e.g., linear discriminant analysis, regularized QDA).

Figure 6:
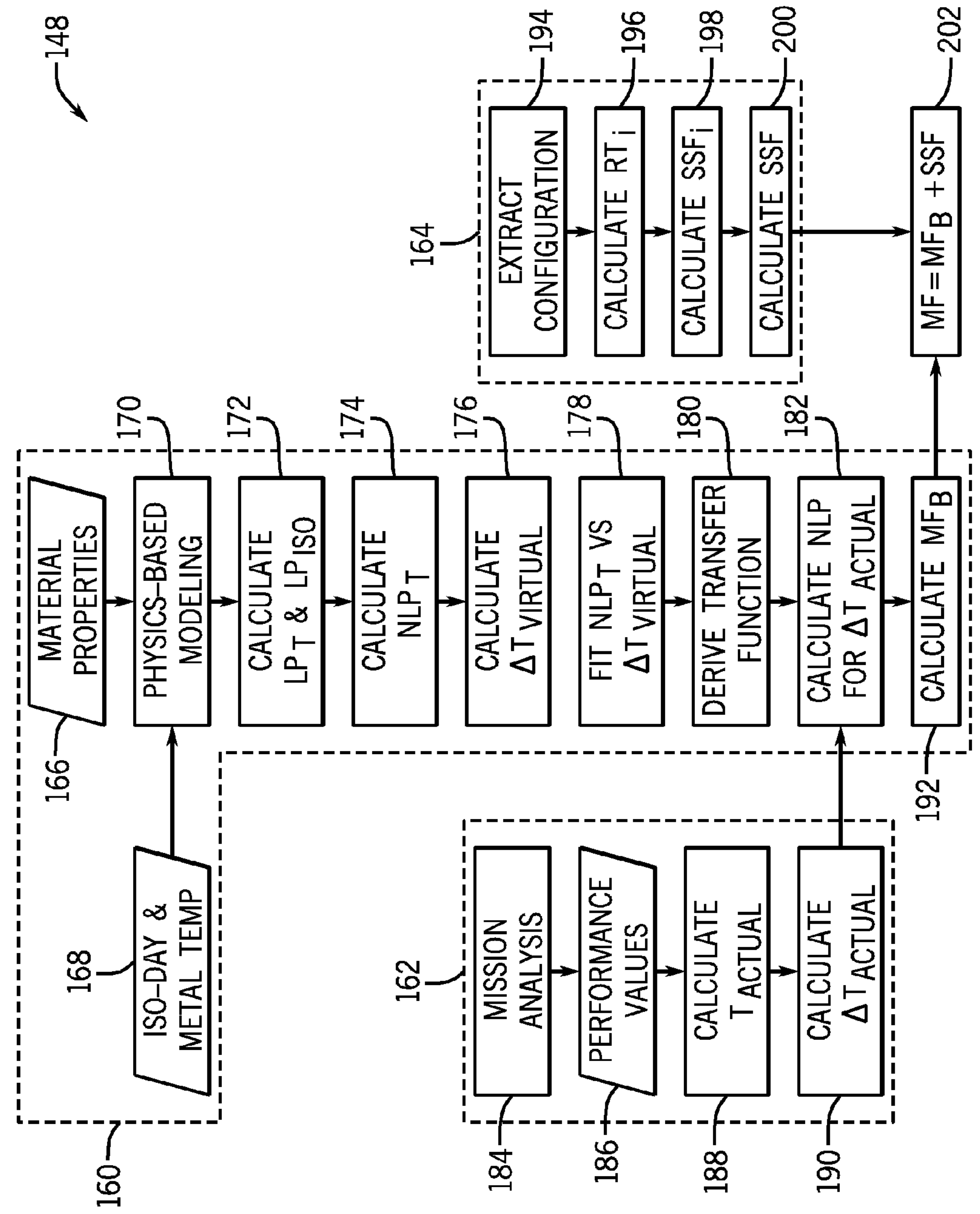
FIG. 6 depicts a flow chart of an embodiment of a maintenance factor calculation logic.

FIG. 6. illustrates a more detailed view of an embodiment of the MF calculation logic 148 as illustrated in FIG. 5. In the illustrated embodiment, the MF calculation logic 148 may be further subdivided into an MF transfer function calculation logic 160, an actual metal temperature calculation logic 162, and a mixed hardware configuration logic 164. The MF transfer function logic 160 may enable the derivation of a set of LP functions suitable for calculating a base $MF_b$, while the actual metal temperature calculation logic 162 may be used for the calculation of $\Delta T_{ACTUAL}$. The base $MF_b$ may then be used to obtain the MF for each individual unit 10. Accordingly, the specific configuration of each turbine system 10 can be taken into account, including configurations that have mixed hardware through the mixed hardware configuration logic 164. Mixed hardware configurations are configurations that may have been, for example, retrofitted with newer component designs. Indeed, the MF calculation logic 148 described herein enables the MF calculation of individual turbine systems 10 having a mix of original and updated hardware configurations.

The MF transfer function logic 160 may use metal properties 166, such as metal type and material composition, in addition to ISO-day and metal temperature values 168 during physics-based modeling (block 170) of a turbine 10 component and/or location (e.g., inboard lockwire tab). As mentioned above, the physics-based modeling (block 170) may derive LP as a function based on $T_{metal}$, σ, and $N_{ratio}$ by using techniques such as LCF life prediction modeling, CFD, PEA, solid modeling (e.g., parametric and non-parametric modeling), and/or 3-dimension to 2-dimension PEA mapping. A LP for multiple "virtual" temperatures $T_{VIRTUAL}$ (i.e., $LP_T$) and an LP for ISO-day temperatures (i.e., $LP_{ISO}$) may then be calculated (block 172). The term "virtual" temperature is used to denote a series of temperatures values, which may include actual measured temperatures. For example, the term may denote all temperatures in the temperature series beginning at −10° F. and ending at 1200° F., having 1° F. increments (i.e., −10° F., −9° F., −8° F., . . . , 1200° F.). Such a calculation allows for the derivation of a normalized $LP_T$ ($NLP_T$) through the use of the equation $NLP_T=LP_T/LP_{ISO}$ (block 174). A $\Delta T_{VIRTUAL}$ may then be calculated (block 176) based on the equation $\Delta T_{VIRTUAL}=T_{VIRTUAL}-T_{ISO}$ (block 178).

The $NLP_T$ and $\Delta T_{VIRTUAL}$ values may then be used as part of a data fit process (block 180) in which the $NLP_T$ and the $\Delta T_{VIRTUAL}$ values are disposed as a scatter plot having the $NLP_T$ values in the y-axis and the $\Delta T_{VIRTUAL}$ values in the x-axis. In one embodiment, a transfer function may be derived (block 180) by fitting the $NLP_T$ vs. $\Delta T_{VIRTUAL}$ scatter plot using a non-linear fit or function for the negative or zero $\Delta T_{VIRTUAL}$ values, and an exponential fit or function for the positive $\Delta T_{VIRTUAL}$ values. That is, x-axis values less than or equal to zero are fitted using a non-linear fit, while the positive x-axis values are fitted using an exponential fit.

A calculation of NLP for all $\Delta T_{ACTUAL}$ values (block 182) may then use the derived transfer function. The $\Delta T_{ACTUAL}$ values may be calculated by using the actual metal temperature calculation logic 162, as depicted. The logic 162 may perform a mission analysis (block 184) as described above with respect to FIG. 4. The mission analysis may result in a set of statistical performance-based values 186. An actual temperature $T_{ACTUAL}$ may be calculated (block 188), for example, based on the metal temperature transfer functions for various locations and/or component parts and using the performance values 186 as inputs. The derived metal temperature function is thus suitable for calculating the actual temperature of metal at a specific location (e.g., lockwire tab, air cooling slot) based on the M&D data 76. The $\Delta T_{ACTUAL}$ values may then be calculated (block 190) by using the equation $\Delta T_{ACTUAL}=T_{ACTUAL}-T_{ISO}$.

The $MF_B$ may then be calculated (block 192) based on the equation $MF_B=1/NLP_T$. The $MF_B$ alone may be suitably used to predict unplanned events, for example, in circumstances where the underlying hardware is configured using a standard configuration, (e.g., default installation configuration). However, some units may have been modified, for example, by replacing components such as the rotor blades with components having a newer design (e.g., backcut rotor blades). Accordingly, the $MF_B$ may be modified by the mixed hardware configuration logic 164 to take into account mixed hardware configurations.

The mixed hardware configuration logic 164 may extract the hardware and software configuration (block 194) for each unit 10, including a historical list of configurations used by each unit 10 and the operating time for each configuration i. An operating time ratio $RT_i$ for each configuration i may then be calculated (block 196) based on the equation $RT_i=T_i/FH$, where $T_i$ is the time the configuration was operational and FH is the total fired hours for the unit. A stress scaling factor $SSF_i$ may then be calculated for each configuration i (block 198). The $SSF_i$ takes into account the stresses specific to the configuration i, based on, for example, metal type, component geometry, and/or location. The mixed configuration SSF may then be calculated (block 200) by using the formula $SSF=\Sigma(RT_i*SSF_i)$. Accordingly, the MF may be calculated (block 202) to take into account the mixed hardware configuration by using the equation $MF=MF_B*SSF$. Such a calculation enables the predictive techniques to be applied to substantially any turbine system 10 regardless of configuration type or date of configuration installation.

Figure 7:
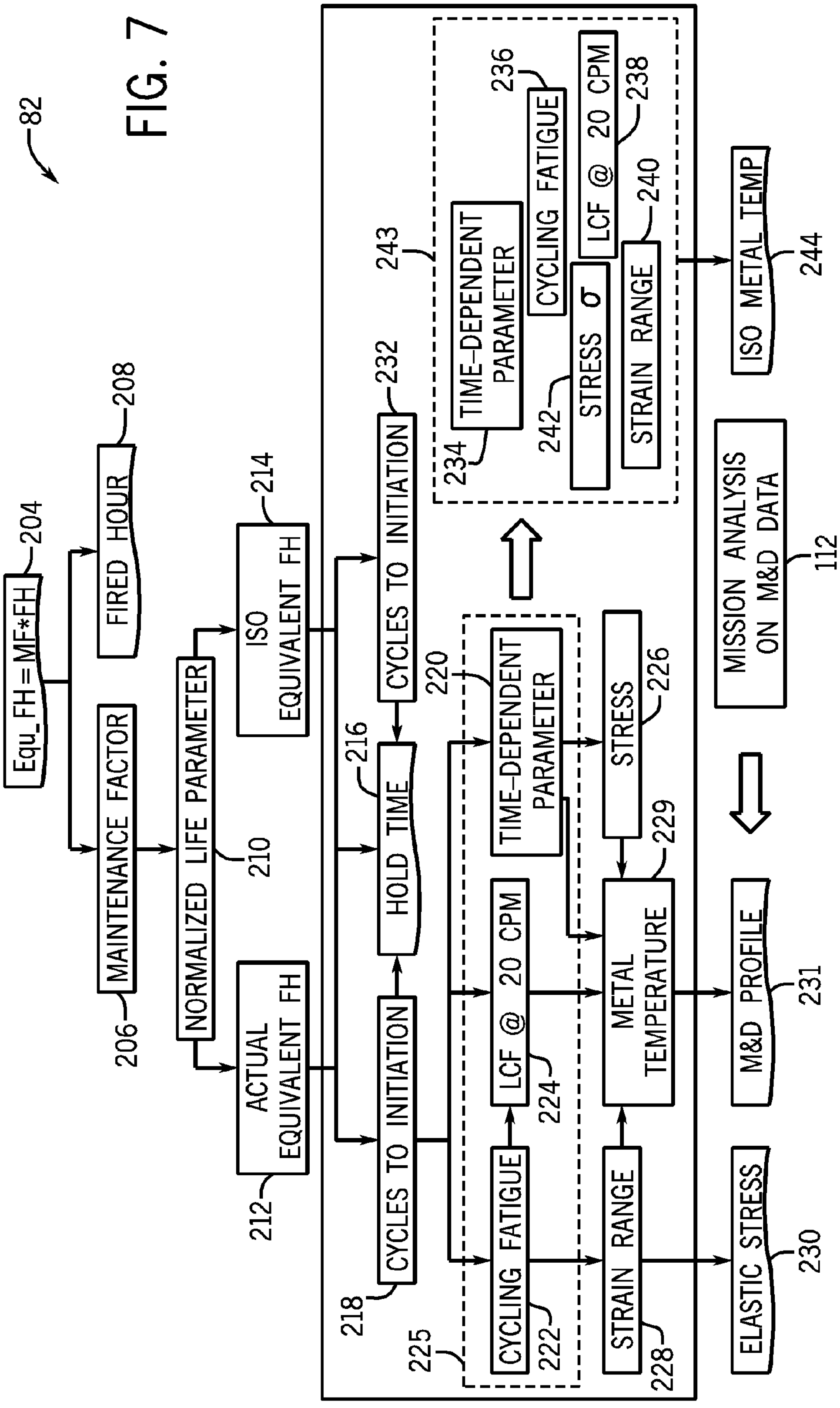
FIG. 7 depicts a flow chart of an embodiment of a plurality of hybrid risk models.

FIG. 7 depicts embodiment of the hierarchical hybrid risk model 82. The depicted embodiment includes an equivalent fired hour model 204 (i.e., Equivalent_FH=MF*FH), which enables an integration of physics-based analysis with empirical analysis suitable for calculating a time to the occurrence of unplanned maintenance events. The hybrid risk model 82 may include a MF calculation submodel 206 and a fired hour submodel 208. The Fired Hour submodel 208 enables for the calculation of the fired hours observed in a given unit 10, and may include data cleaning and validation techniques suitable for removing errors and invalid data from the observed fired hours. The MF calculation submodel 206 enables the calculation of the MF (e.g., SSF*1/NLP) based on, for example, an NLP submodel 210. In this embodiment, the NLP submodel 210 may include an actual equivalent FH submodel 212 suitable for calculating an actual equivalent fired hour using approximately two year's worth of M&D data (i.e., $Equivalent\_FH_{2YR}$). It is to be understood that other embodiments may use smaller or larger data timelines, such as 6 months, 1 year, 1.5 years, 2.5 years, or 4 years. The NLP submodel 210 may also include an ISO-Equivalent FH submodel 214 suitable for calculating an ISO-day equivalent fired hour (i.e., $Equivalent\_FH_{ISO}$). Accordingly, the NLP submodel 210 may calculate an NLP value by using the equation $NLP=Equivalent\_FH_{2YR}/Equivalent\_FH_{ISO}$.

The Actual Equivalent FH submodel 212 may calculate the $Equivalent\_FH_{2YR}$ values by using the equation $Equivalent\_FH_{2YR}=N_{i,HT2YR}*Hold\_Time$, where $N_{i,HT\text{-}2YR}$ is a initiation life or number of cycles until initiation of an unplanned event such as the appearance of a crack in metal for a given cyclic hold time (HT) 216 or dwell time. In other words, $N_{i,HT\text{-}2YR}$ measures the number of cycles during which a location or component having a specific type of metal (e.g., inconel IN706) may begin to crack, based on the hold or dwell time 216 at a certain temperature. $N_{i,HT\text{-}2YR}$ may be calculated by a cycle to initiation submodel 218 as a function of HT 216, a time-dependent parameter $P_T$, a fatigue parameter $P_{FAT}$, and a continuous cycling LFC parameter $N_{i,20\ CPM}$.

The cycles to initiation submodel 218 uses the hold time 216, a cycling fatigue submodel 222, a low cycle fatigue submodel 224, and a time-dependent parameter submodel 224 to derive the embodied calculations. The models 220, 222, and 224 are included in an actual submodel 225 that uses actual data instead of ISO-based data. The hold time 216 is a measure of the amount of time spent in a holding or dwell period. The cycling fatigue submodel 222 may calculate the fatigue parameter $P_{FAT}$ based on the equation $P_{FAT}=1/N_{i,20\ CPM}$ where $N_{i,20\ CPM}$ is derived by the low cycle fatigue submodel 224. The low cycle fatigue submodel 224, for example, may derive $N_{i,\ 20CPM}$, at 20 cycles per minute (CPM) as a function of uni-axial strain range $\Delta\epsilon$ for a given temperature and metal (e.g., inconel IN706). It is to be understood that other CPM values may be used, such as 5 CPM, 15 CPM, 25, CPM, 30 CPM, and so forth.

The time-dependent parameter submodel 220 enables the calculation of the time-dependent parameter $P_T$. $P_T$ is a parameter suitable for measuring time until damage occurs and may be obtained based on the metal temperature transfer functions 229 described in more detail above with respect to FIGS. 3 and 4, which in turn use the M&D profile 231 derived from the mission analysis 112. In one embodiment, the time-dependent parameter $P_T$ may also include a mid-life "Neuberized" stress model 226. That is, Neuber's rule stating a relationship of an elastic stress concentration factor $K_t^2=K_\sigma K_\epsilon$ between a strain factor $K_\sigma$ and a stress factor $K_\epsilon$ may be used by the stress model 226. The cycling fatigue submodel 222 may also include a strain range $\Delta\epsilon$ submodel 228, which may be based on elastic stress 230. That is, the strain range $\Delta\epsilon$ may be derived by the submodel 228 as a function of temperature and the elastic stress 230. The ISO-Equivalent FH submodel 214 may include a set of submodels 232, 234, 236, 238, 240, 242 substantially similar to the submodels 220, 222, 224, 226, 228. However, the submodels 232, 234, 236, 238, 240, and 242 use an ISO metal temperature 244 instead of using actual temperatures. Accordingly, the submodels 234, 234, 236, 238, 240, and 242 are included in an ISO-based submodel 243 that uses ISO data instead of only actual data.

More specifically, the time-dependent parameter submodel 234 uses the metal temperature transfer functions and ISO metal temperatures 244 to calculate a parameter suitable for measuring time until damage occurs. The cycling fatigue submodel 236 may derive a fatigue parameter $P_{ISO\text{-}FAT}=1/N_{i,20\ ISO\text{-}CPM}$, where $N_{i,20\ ISO\text{-}CPM}$ is derived by the low cycle fatigue submodel 238. The low cycle fatigue submodel 238, for example, may derive $N_{i,20\ ISO\text{-}CPM}$ at 20 cycles per minute (CPM) as a function of uni-axial strain range $\Delta\epsilon$ for a given ISO metal temperature 244 and metal (e.g., inconel IN706). Likewise, the strain 240 and stress 242 submodels may derive strains and stresses based on a given ISO metal temperature 244.

Figure 8:
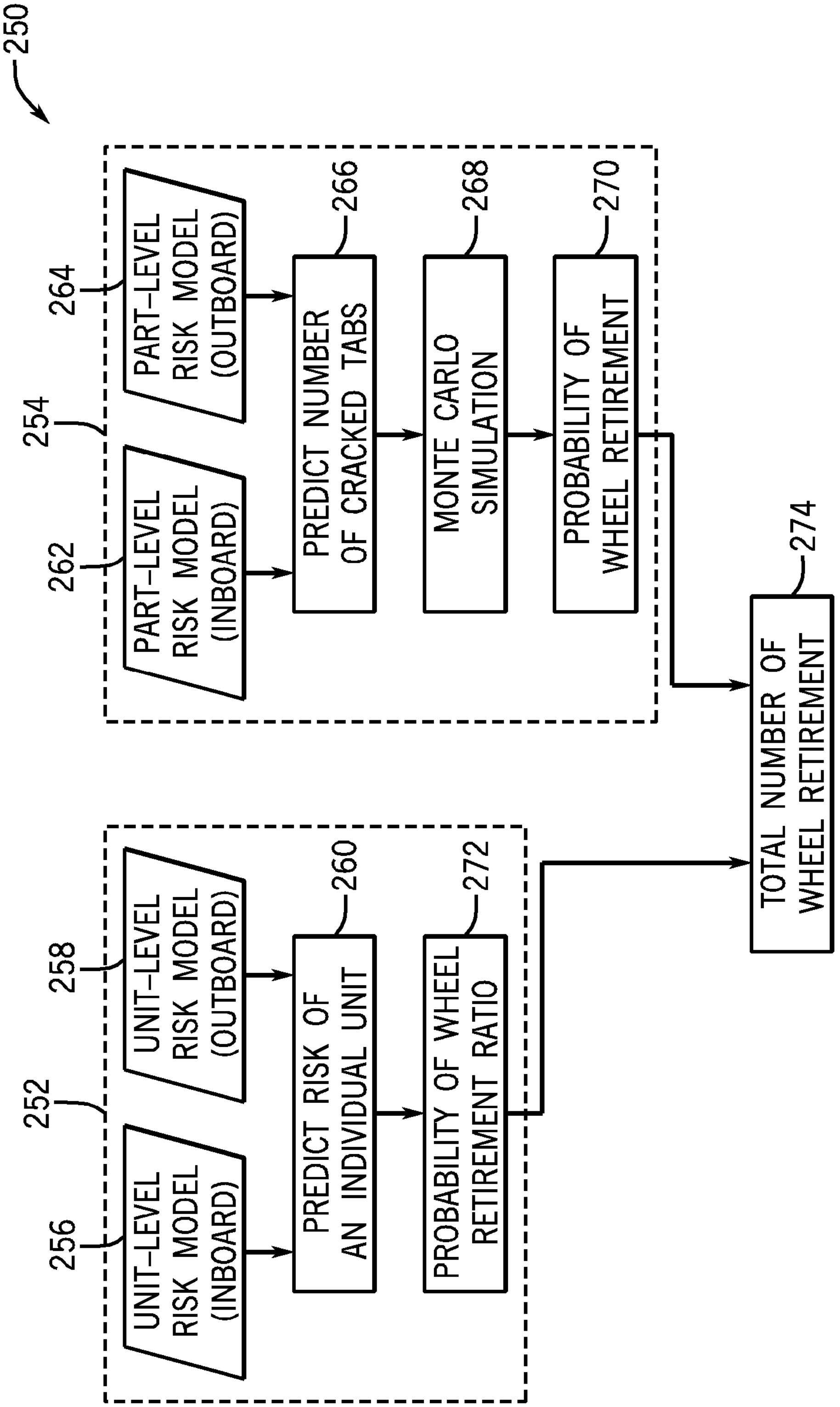
FIG. 8 depicts a flow chart of an embodiment of a process suitable for predicting rotor wheel retirement.

FIG. 8 depicts a logic 250 suitable for predicting a total number N of rotor wheel retirements by applying the hybrid models described above with respect to FIG. 7. The logic 250 may be further subdivided into a unit level analysis logic 252 and a part-level analysis logic 254. The unit level analysis logic 252 may include a unit-level risk model 256 suitable for predicting the occurrence of unplanned events. The unit-level risk model 256 may use the hybrid risk models described above with respect to FIG. 7 and may be used to predict the probability of occurrence of an unplanned maintenance event for an individual unit 10. The unit-level risk model 256 may include, for example, the equivalent fired hour hybrid model 204 derived for a specific location in a turbine component, such as the inboard side of a lockwire tab. Likewise, a second unit-level risk model 258 modeling a different location in the turbine component, such as the outboard side of the lockwire tab, may also be used. Accordingly, the second unit-level risk model 258 may also include embodiments of the hybrid risk models described with respect to FIG. 7, but directed at a different modeled location (e.g., outboard side of the lockwire tab) from the location modeled by the unit-level risk model 256 (e.g., inboard side of the lockwire tab).

A prediction of the risk of a unit 10, such as failure due to a lockwire tab crack (inboard or outboard crack) may then be derived (block 260), for example, based on the unit-level risk models 256 and 258. The prediction of risk (block 260) may include a proportional hazard model (PHM), such as a Weibull PHM, suitable for relating certain variables (e.g., Equivalent_FH, $N_{RATIO}$, % Warm starts), to the fired hours before the occurrence of an unplanned maintenance event. For example, the Weibull PHM may enable the derivation of the probability of the occurrence of various unplanned events based on the current fired hours for a given unit 10.

The part-level analysis logic 254 may incorporate a part-level risk model 262 suitable for modeling the risk associated with a specific part and part location. For example, the part-level risk model 262 may be derived to model the inboard side of a lockwire tab. In other words, the part-level risk model 262 is similar to the unit-level risk model 256, but is directed at modeling risk for a location of a generic part instead of the risk associated with the use of the part in an individual unit 10. Likewise, a part-level risk model 264 may be derived for modeling the risk associated with a different location of the generic part, such as the outboard side of the lockwire tab. The models 262 and 264 may then be used to predict the number of cracked lockwire tabs (block 266). In one embodiment, the prediction of the number of cracked lockwire tabs (block 266) may include using a probability function Pr (i) derived from the models 262 and 264, where Pr (i) is the probability of cracking for a single tab i. Accordingly, a set of probability functions {Pr (1), Pr (2), . . . Pr (i), . . . , Pr (Total number of tabs} may be derived based on the models 262 and 264.

In the illustrated embodiment, a Monte Carlo simulation (block 268) is used to predict the probability Pr (≥retirement threshold) of meeting or exceeding a certain wheel retirement threshold. For example, the wheel retirement threshold may be met or exceeded if three or more adjacent lockwire tabs are cracked. Any suitable Monte Carlo simulation may be used, including iterative simulations that calculate probability distributions by simulating the set of probability functions {Pr (1), Pr (2), . . . Pr (i), . . . , Pr (Total number of tabs)} based on sampled random variables. For example, during each iteration, the set of probability functions {Pr (1), Pr (2), . . . Pr (i), . . . , Pr (Total number of tabs)} may be used to calculate and store a set of probability values. As more iterations are simulated, the stored values are used to define the probability Pr (≥retirement threshold). Accordingly, a probability of wheel retirement (block 270) may be derived based on the sum of all simulation iterations or scenarios.

In one embodiment, a probability of wheel retirement ratio may be calculated (block 272), based on actual inspection results. For example, inspection logs may be analyzed to determine the ratio of actual failure versus predicted failure. The probability of wheel retirement ratio (block 272) may then be integrated with the derived probability of wheel retirement (block 270) to calculate a total number of wheel retirement (block 274). Indeed, by applying the techniques described herein, including the use of hybrid risk models, maintenance may be substantially improved by enabling the prediction of the number of wheels that may need retirement. For example, procurement of replacement rotor wheels from the manufacturer may necessitate a certain lead or wait time. Accordingly, a parts purchasing or parts replenishment system may order the replacement wheels in advance of actual retirement. It is to be understood that the techniques described herein may be used in other applications such as financial and/or decision support applications. By having a substantially improved suite of techniques useful in unplanned event prediction, financial decisions may now be made that integrate business operations with engineering analysis. For example, business operations relating to inventory management, parts procurement, logistics, maintenance scheduling, maintenance operations, and so forth, may be improved.

Technical effects of the invention include modeling techniques that enable the integration of physics-based modeling with statistical techniques into hybrid models. The hybrid models may result in an improved predictive estimation of events such as unplanned maintenance events.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for analyzing turbomachinery comprising:

a processor programmed to:

execute a hybrid risk model comprising a physics-based sub model and a statistical sub model, wherein the physics-based sub model is configured to model physical components of a gas turbine system by using a life parameter (LP) function F (metal temperature $T_{metal}$, stress σ at a location of interest of the gas turbine system, fired hours per start of the gas turbine system)=remaining time before unplanned event occurrence based on a data set, and the LP function F is used by the processor to derive a physics-based maintenance factor (MF) derivation MF=SSF*1/NLP where SSF is a stress scaling factor and NLP is a normalized LP function F, and the statistical sub model is configured to model historical information of a gas turbine unit by calculating an actual fired hours for the gas turbine unit, and wherein the processor is configured to calculate an equivalent fired hour parameter Equivalent FH=MF*FH where FH is the actual fired hours by combining the MF derivation with the actual fired hours and to transform the equivalent fired hour parameter into a probability of retirement of a component of the gas turbine unit by predicting a probability of occurrence of the unplanned event based on a current number of fired hours for the gas turbine unit.

2. The system of claim 1, wherein the processor is configured to determine a remaining operational life of the component by using the probability of retirement.

3. The system of claim 1, wherein the processor is configured to apply a data mining to sensor data acquired for a fleet of the gas turbine class to derive the LP function F by executing a regression analysis comprising a linear or non-linear fit of a plurality of data points included in the sensor data, by classifying the plurality of data points as members of a group having a desired probability of having the remaining time before unplanned event occurrence, or a combination thereof.

4. The system of claim 1, wherein the probability of retirement comprises a lockwire tab retirement probability, an air cooling slot retirement probability, a wheel retirement probability, a blade retirement probability, or a combination thereof.

5. The system of claim 1, wherein the statistical sub model comprises a turbine system component installation history, a turbine system component utilization history, a turbine system fleet utilization history, a plurality of monitoring and diagnosis sensor data, or a combination thereof.

6. The system of claim 5, wherein the statistical sub model comprises a Weibull risk model configured to derive a survival function between a first inspection event of the gas turbine unit and a second inspection event of the gas turbine unit by using an interval censoring approach.

7. The system of claim 1, comprising an asset management system, wherein the asset management system collects turbine system data and uses the hybrid risk model and the collected turbine system data to manage turbine system components.

8. The system of claim 1, comprising a controller having the processor, and wherein the processor is configured to control the gas turbine unit.

9. A non-transient machine readable computer media comprising executable instructions configured to:

retrieve a data correlative of operations of a gas turbine system;

transform the data into an equivalent fired hour Equivalent_FH=MF*FH where FH is an actual fired hour for a gas turbine unit by executing a hybrid risk model comprising a physics-based sub model and a statistical sub model, wherein the physics-based sub model is configured to model physical components of a gas turbine system by using a life parameter (LP) function F (metal temperature $T_{metal}$, stress σ at a location of interest of the gas turbine engine, fired hours per start of the gas turbine engine)=remaining time before unplanned event occurrence based on a data set, and wherein the LP function F is configured to derive a physics-based maintenance factor MF=SSF*1/NLP where SSF is a stress scaling factor and NLP is a normalized LP function F, and the statistical sub model is configured to analyze historical gas turbine unit information by calculating the actual fired hours for the gas turbine unit; and, transform the equivalent fired hour parameter into a probability of retirement of a component of the gas turbine unit by predicting a probability of occurrence of the unplanned event based on a current number of fired hours for the gas turbine unit.

10. The computer media of claim 9, comprising executable instructions configured to derive a remaining operational life of the component by using the probability of retirement.

11. The computer media of claim 9, comprising executable instructions configured to analyze sensor data acquired for a fleet of the gas turbine class to derive the LP function.

12. The computer media of claim 9, wherein the probability of retirement comprises a rotor wheel retirement probability.

13. The computer media of claim 12, wherein the rotor wheel retirement probability comprises a first stage wheel retirement probability, a second stage wheel retirement probability, a third stage wheel retirement probability, or combination thereof.

14. The computer media of claim 9, comprising executable instructions configured to predict a cooling air slot cracking, a lockwire tab cracking, a blade cracking or a combination thereof, by executing the hybrid model.

15. The computer media of claim 9, wherein the statistical sub model comprises a turbine system component installation history, a turbine system component utilization history, a turbine system fleet utilization history, a plurality of turbine system sensor data, or a combination thereof.

16. The computer media of claim 9, comprising an asset management system, wherein the asset management system collects turbine system data and uses the hybrid risk model and the collected data to manage turbine system components.

17. A method of creating and using a hybrid risk model comprising:

retrieving a data set correlative of operations of a gas turbine system;

transforming the data set correlative of operations by analyzing physical components of the gas turbine system to obtain a physics-based analysis by deriving a maintenance factor MF=SSF*1/NLP where SSF is a stress scaling factor and NLP is a normalized LP function F, wherein the MF is based on a life parameter (LP) function F (metal temperature $T_{metal}$, stress $\sigma$ at a location of interest of the gas turbine engine, fired hours per start of the gas turbine engine)=remaining time before unplanned event occurrence based on a data set;

analyzing historical data of a gas turbine unit to obtain the actual fired hours for the gas turbine unit;

integrating the physics-based analysis and the actual fired hours into a hybrid risk model comprising an equivalent fired hour parameter Equivalent_FH=MF*FH where FH is the actual fired hours by combining the MF derivation with the actual fired hours;

and;

transforming the equivalent fired hour parameter into a probability of retirement of a component of the gas turbine unit by predicting a probability of occurrence of the unplanned event based on a current number of fired hours for the gas turbine unit, wherein transforming the data and transforming the equivalent fired hour parameter are performed by a computing device.

18. The method of claim 17, comprising deriving the LP function by applying a data mining to sensor data acquired for a fleet of the gas turbine class.

19. The method of claim 17, comprising identifying a subset of monitoring and diagnosis (M&D) variables useful in deriving the probability of retirement of the component from a set of M&D variables based on an M&D data acquired from a fleet of the gas turbine class by using a quadratic discriminant analysis (QDA) classification and wherein transforming the equivalent fired hour parameter into the probability of retirement of the component comprises combining the equivalent fired hour parameter and the subset of M&D variables and then transforming the equivalent fired hour parameter and the subset of M&D variables into the probability of retirement.

* * * * *